United States Patent
Goldberg et al.

(10) Patent No.: US 6,389,038 B1
(45) Date of Patent: May 14, 2002

(54) VOICE IP BANDWIDTH UTILIZATION

(75) Inventors: Harold J. Goldberg, Lakewood; Jeffrey S. Skelton, Perrineville; Chaim M. Ackerman, Lakewood, all of NJ (US)

(73) Assignee: Net 2 Phone, Hackensack, NJ (US)

( * ) Notice: Subject to any disclaimer, the term of this patent is extended or adjusted under 35 U.S.C. 154(b) by 0 days.

(21) Appl. No.: 09/488,678

(22) Filed: Jan. 21, 2000

Related U.S. Application Data

(60) Provisional application No. 60/117,289, filed on Jan. 26, 1999.

(51) Int. Cl.[7] ................................................. H04J 3/22
(52) U.S. Cl. ........................................ 370/471; 370/473
(58) Field of Search ................................ 370/471, 473, 370/474, 475, 352, 356, 401

(56) References Cited

U.S. PATENT DOCUMENTS

| | | |
|---|---|---|
| 5,583,859 A | 12/1996 | Feldmeier |
| 5,802,050 A * | 9/1998 | Petersen et al. ............ 370/394 |
| 5,905,727 A * | 5/1999 | Christensen et al. ........ 370/395 |
| 5,910,954 A | 6/1999 | Bronstein et al. |
| 5,943,344 A | 8/1999 | Keller et al. |
| 6,014,368 A | 1/2000 | Sanami |

OTHER PUBLICATIONS

"The Authoritative Dictionary of IEEE Standard Terms", Seventh Edition, p. 716.*

* cited by examiner

Primary Examiner—Chau Nguyen
Assistant Examiner—D. Trinh
(74) Attorney, Agent, or Firm—Oblon, Spivak, McClelland, Maier & Neustadt, P.C.

(57) ABSTRACT

A method and system for combining plural independently addressable packets into a SuperPacket to improve the utilization of a communications channel. The method and system reduce the percentage of the header information that is redundant between packets and/or redundant based on the source and destination addresses of the packets as compared to the data payload. The combined SuperPackets are disassembled at a terminating gateway or at a second multiplexer. The reduction in header information is especially useful in voice over IP communications systems where the data is voice information that is kept in small packets to avoid latency.

11 Claims, 4 Drawing Sheets

VOICE IP BANDWIDTH UTILIZATION

CROSS-REFERENCE TO CO-PENDING APPLICATIONS

The present application is related to and claims priority to U.S. provisional application Ser. No. 60/117,289, entitled "Improving Voice IP Bandwidth Utilization," filed on Jan. 26, 1999. The contents of that application are incorporated herein by reference.

BACKGROUND OF THE INVENTION

1. Field of Invention

The present invention is directed to a method and system of increasing the effective bandwidth of Internet Protocol (IP) communication links.

2. Description of the Background

The use of data networks, and in particular IP networks, to transmit voice conversation has been discussed in a several patents and publications including U.S. Pat. No. 4,771,425 to Baran et al. and Request for Comments (RFC 1789) entitled "Inet Phone: Telephone Services and Servers on Internet" dated April 1995. The contents of both those references are incorporated herein by reference. One advantage of transmitting voice over data networks is the elimination of the expensive TDM (time division multiplexing) switching equipment needed for traditional circuit switched handling of voice. A network of IP routers replaces the traditional switch and forwards the voice packets from the source to the destination.

A benefit of using network routing to guide the voice packets is the ability to automatically take the shortest route between the origination and destination points, as determined dynamically by the network routing protocols. An additional benefit is the automatic re-routing of traffic due to link failures, provided that an alternate paths exist. The benefits of data networks carrying voice, however, derive from the fact that addressing information is carried in every packet sent over the network.

As shown in FIG. 1, the standard Internet UDP protocol takes 28 bytes of header information (i.e., 20 bytes of IP header (inter-network addressing) and 8 bytes of UDP (protocol identification and packet information)), for each packet of data. (Additional details of IP-based communications can be found in Internetworking with TCP/IP, Vols. 1–3, by Comer and Stevens, the contents of which are incorporated herein by reference). Moreover, voice packets sent via IP carry relatively small payloads of data to reduce latency. Therefore, the overhead used by the UDP/IP header is a large percentage of the traffic over any given network link. This reduces the number of voice packets per time that can be sent over a link compared to a hypothetical protocol with a smaller header.

Modifications in routing IP-based packets have been proposed in the context of adding information to individual packets to enlarge those packets to provide additional services, such as mobility in a wireless system. One such modification called "IP-within-IP" (IPIP) was proposed by Ioannidis et al. in "IP-based Protocols for Mobile Internetworking," SIGCOMM '91 Conference Proceedings on Communications Architectures & Protocols, published as Computer Communication Review, Vol. 21, Number 4, September 1991, pages 235–245, the contents of which are incorporated herein by reference.

SUMMARY OF THE INVENTION

It is an object of the present invention to address the inefficient use of bandwidth resulting from communication protocol headers in the transmission of packets over a common communications channel.

It is a further object of the present invention to provide a more efficient UDP/IP header structure for transmitting packets over a common IP link.

It is a further object of the present invention to provide a more efficient UDP/IP header structure for transmitting voice and/or data packets over a common IP link.

These and other objects of the present invention are achieved by a first multiplexer which repackages plural packets into a SuperPacket in order to reduce the percentage of a packet that is dedicated to header information. After transmitting a SuperPacket from the first multiplexer to a second multiplexer, the second multiplexer splits the Super-Packet back into substantially its original sub-components with their original formats.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
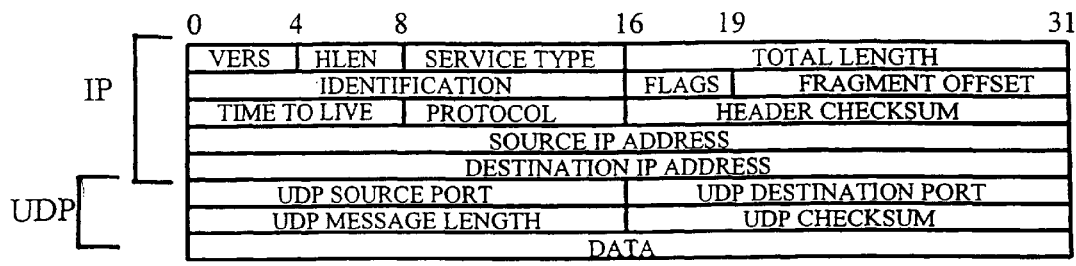
FIG. 1 is a block diagram of concatinated headers for UDP/IP communications packets.
Figure 2:
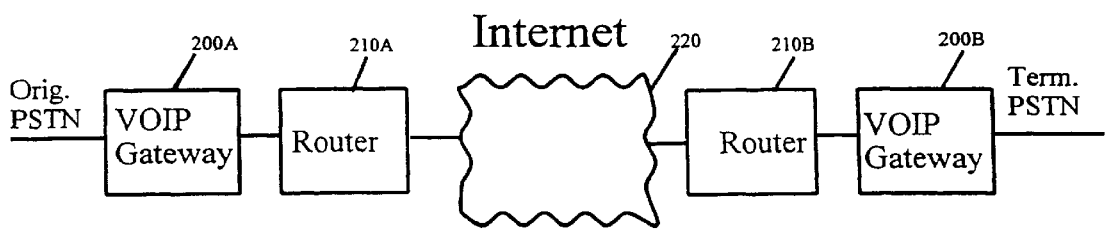
FIG. 2 is a conceptual illustration of two gateways that transmit/receive packets between each other without the use of a multiplexer (MUX)

Turning now to the drawings, wherein like reference numerals reference the same or similar elements throughout the several figures, FIG. 2 is a conceptual illustration of two gateways that transmit/receive packets between each other without the use of a multiplexer (MUX) according to the present invention. Although the present invention will be discussed hereinafter using an example of a voice over IP connection between an originating gateway and a destination gateway, generally, one of ordinary skill in the art would appreciate that the connection can be between any two communication points (within the same country or in different countries) that use separately addressable packets which are combined into a SuperPacket.

As shown, a first Voice Over IP (VOIP) Gateway 200A is connected to the Public switch telephone network (PSTN) on the originating side. The VOIP gateway 200A converts voice packets into data to be transmitted (1) by the router 210A to (2) the router 210B via a wide area network (WAN) 220, such as the Internet. One of ordinary skill in the art would also appreciate that the WAN 220 may alternatively be a LAN or a satellite/wireless network. The packets received by the second router 2101B are passed to the terminating VOIP gateway 200B which is connected to the terminating PSTN. In a preferred embodiment, the originating end is the U.S. and the terminating end is a country which has a high telephone communications rate with the U.S., e.g., Japan or China. Moreover, typically each VOIP gateway utilizes 24 channels of voice per side. Each of the 24 channels utilizes independent packets of voice for each channel.

As discussed above, each UDP/IP packet has its own UDP/IP header. (Although the discussion herein is provided in terms of UPDIIP packets, one of ordinary skill in the art would understand that the method of the present invention is similarly applicable to reliable datagram protocol (RDP) and transmission control protocol (TCP)). When the originating VOIP gateway 200A is sending all 24 channels to the terminating VOIP gateway 200B using voice packets in 30 ms frames, the total number of packets being sent is: 24 channels×33 frames per second=790 frames per second. Using a 6.4 Kb (800 bytes per second) codec technology (e.g., using the G.723 standard), the actual voice sent is 24 bytes per frame, when sending one frame per packet. Thus, for 24 channels, 24×33×24 bytes of voice per second=19008 bytes of voice per second are sent, plus 24×33×28 bytes of header information per second=22176 bytes of header information per second. Since a total of 41184 bytes per second are sent, versus 19008 bytes of voice, there is only approximately a 46% utilization of the bandwidth for the voice content.

Figure 3:
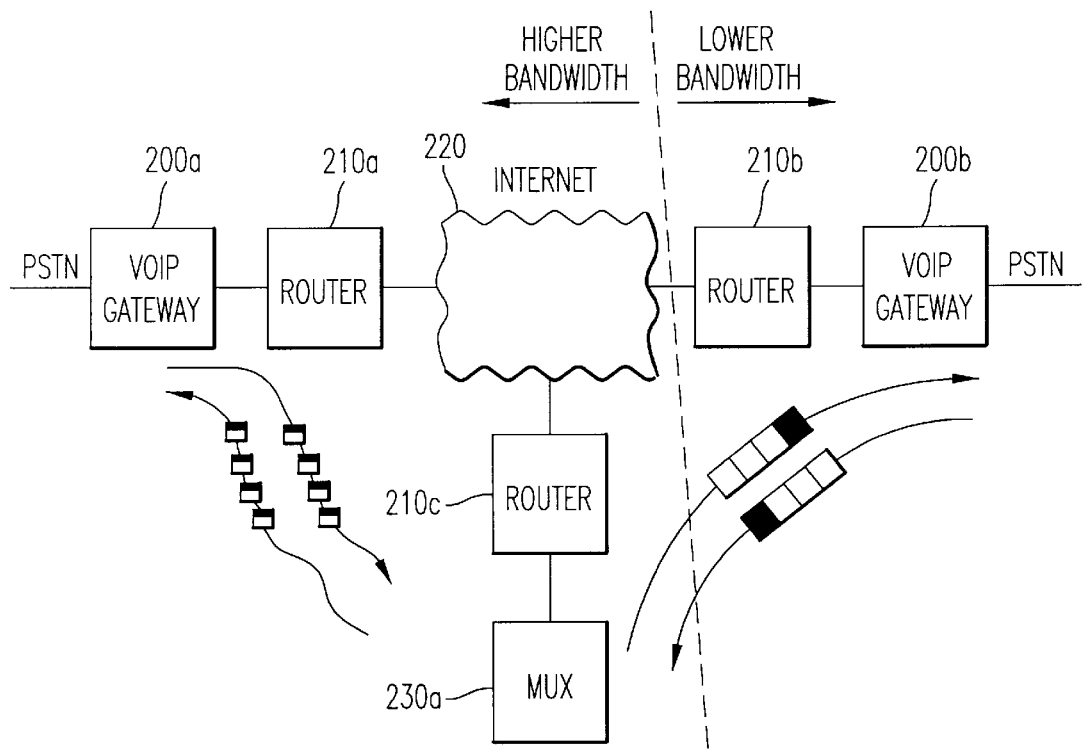
FIG. 3 is a conceptual illustration of a MUX which improves communication between the two gateways of FIG. 2 by concatenating plural packets from the first gateway into a SuperPacket that is transmitted to the second gateway.

By comparison, when using the MUX of FIG. 3 to combine 2 voice frames per packet, the number of packets per second is reduced by almost half. This yields 24×16.5× 48 bytes of voice=199008 bytes, and 24*16.5*28 bytes of header=11088 bytes, yielding about 63% utilization of the transmission line for the voice content. Additional frames per packet can be combined, but at a cost of increased delay that subjects a listener to greater perception of lost packets. However, in embodiments where the frames represent data rather than voice, the additional delay may be acceptable and the loss is hidden by a retransmission of the data.

Generally, the system of the present invention packages more voice frames per packet without adding substantially more delay. The present invention uses a proxy server, called a VOIP-MUX, or simply a MUX 230, to act as an intermediate agent to forward voice packets from the originating gateway 200A to the terminating gateway 200B. Rather than sending packets directly to the terminating gateway, the originating gateway sends the packets to the MUX 230 which combines the packets and sends them as a single larger packet containing the voice for all 25 channels. The present invention advantageously uses a MUX on the side of the WAN that has the higher amount of bandwidth. Then, the combined packets are sent to the remote gateway that has less bandwidth.

The effective yield in bandwidth is described hereinafter, using the parameters in the earlier example. When packaging plural 30 ms frame per packet, 24×33×24 bytes =19008 bytes are allocated to voice, and 1×33×28 bytes=924 bytes are allocated to header. Therefore, the total effective bandwidth utilization is about 95%. In the preferred embodiment, but not in all embodiments, this increase in bandwidth is counter-balanced by the following requirements:

1) Internet packets usually do not exceed 1500 bytes, and
2) other information needs to be included in each packet to identify channel specific information. However, these requirements do not significantly affect the resulting characteristics of the combined packets. Assuring that an otherwise oversized packet is broken into two smaller packets, an additional 28 header bytes of header are sent compared to the oversized packet, and half of the voice data is sent with each smaller packet. Thus, 924 bytes per second of overhead are added.

Through judicious allocation, the requirements for control information can be limited to no more than 8 bytes per frame for a total of 8×66=528 bytes per second of control information. Therefore, the total overhead would be 924+924+ 528=2376 bytes. This yields better than 88% utilization of the bandwidth for voice and can be improved upon by using even less control bytes per packet. Thus, the effective channel bandwidth per channel becomes 6.4 Kb/0.88=7.3 Kb per second, yielding a better than 8 to 1 effective voice compression ratio.

The present invention also is applicable to dedicated/ private remote IP links. Assuming that a dedicated/private link exists somewhere in the path between the originating and terminating gateways, a MUX 230 can be placed on the bandwidth rich side of the path before a slower link. When the link is a T1 (1.544 Mb/s) link, it can handle 212 channels. This provides better than 8:1 compression, yet still yields the other benefits of voice over IP on the originating side of the network, and does not require compression/ decompression as ordinary Telco-style multiplexing equipment would require. The present invention, therefore, enables voice and data to be mixed in voice over IP telephony equipment, without paying a penalty for its use.

Figure 4:
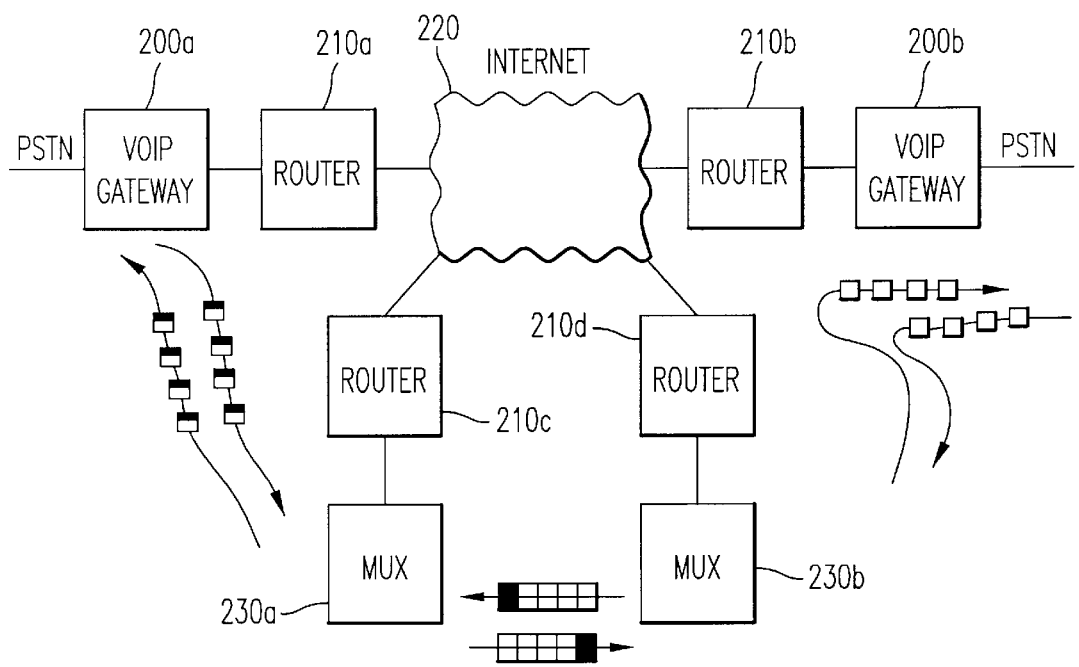
FIG. 4 is a conceptual illustration of 2 MUXes which improve communications between the two gateways of FIG. 2 by concatenating plural packets from the first gateway into a SuperPacket that is transmitted to the second gateway.
Figure 5:
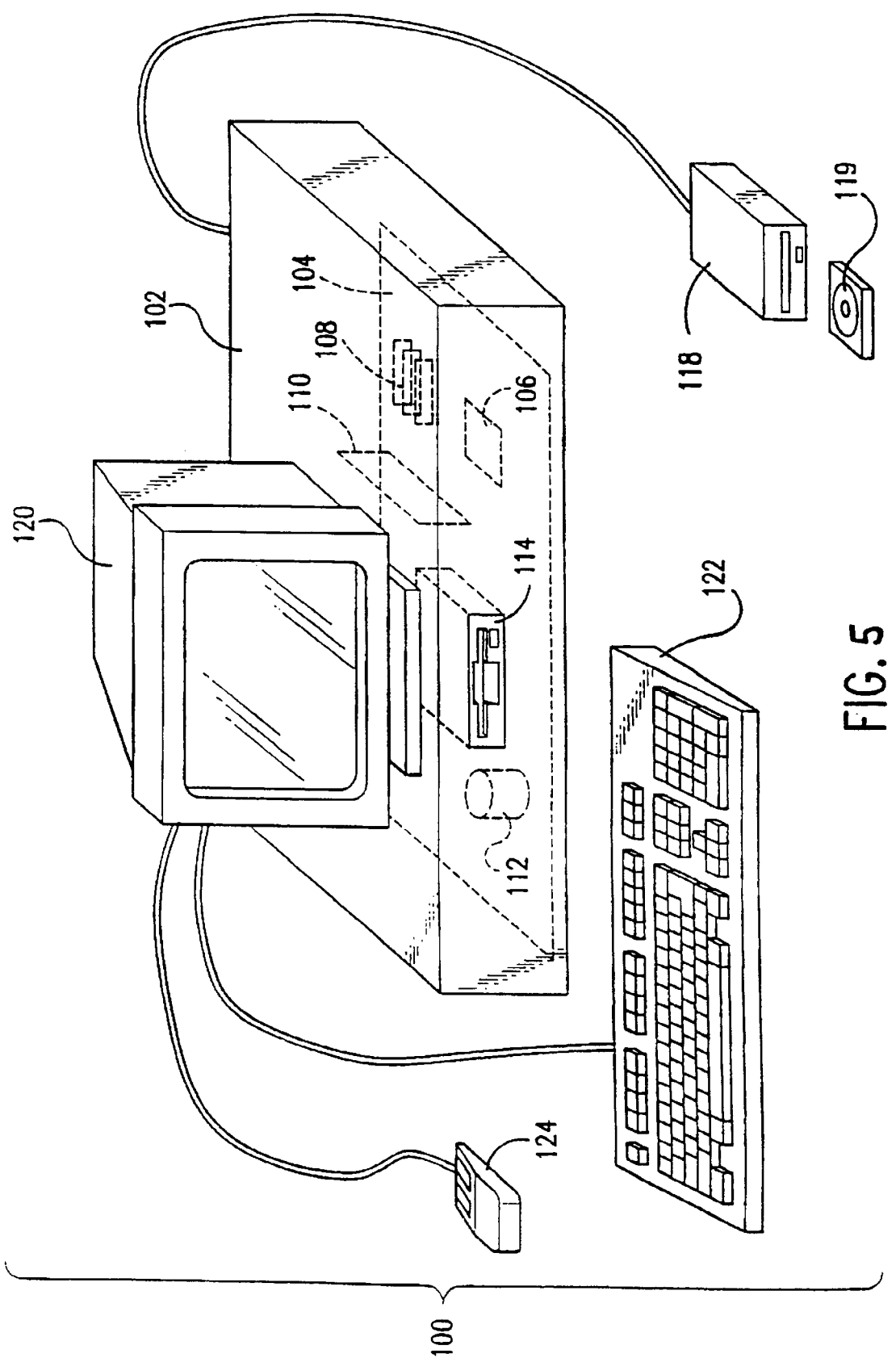
FIG. 5 is a schematic illustration of a computer for performing the functions of the MUX.

As discussed earlier, the present invention can also be used to handle non-voice traffic. Anywhere there is a remote side that is bandwidth limited, a MUX can be set up in a richer bandwidth environment to package up data to and from the remote site. The mechanics are basically the same as described herein, but each different service may require protocol specific code to be developed, like current proxy servers used for firewalls. Finally, to reduce the need to change the software on the remote site, MUXes can be set up in pairs, one on the local side and one on the remote side that handle the packaging/depackaging of the packets without the application knowing anything at all about the mechanism at the cost of a second MUX per link, as shown in FIG. 4.

When embedding or concatenating multiple smaller voice packets into a larger packet (i.e., a SuperPacket) that does not exceed the maximum Internet frame size, the maximum number of channels per SuperPacket is set to 15. This allows 30 channels to be handled for E1 deployment (with a corresponding increase in link bandwidth of 2 Mbps vs 1.544 Mbps for a T1).

Each SuperPacket contains 8 control bytes. The first byte of the SuperPacket contains a 4 bit sequence number for frame loss detection. The next 4 bits are reserved. The next four bytes provide 2 bits for each of 15 channels (with 2 bits left over). These two bits per channel indicate the number of regular packets that are consolidated into the SuperPacket. Therefore, when there are no packets for a particular channel, the two bits contain '00'. When there is one packet they contain '01', and for two packets the bits contain '10'. The final combination, '11', is reserved. This encoding allows the MUX to synchronize with each of the individual outside channels by occasionally sending two regular packets in one SuperPacket, and other times sending no data for a particular channel. This also provides for variable SuperPacket size, and therefore, provides available bandwidth for sending call control information on the link when a particular channel is idle.

Following the 8 control bytes, voice data is encoded for each active channel. The number of frames of encoded data is determined by the original call setup, described below. The size of each frame is determined from the encoded data itself. In one embodiment, the top two bits of the encoded data determine voice, background silence, fax (with its own size byte) or other encoded frames. For voice frames, the size is determined by the encoder chosen at call setup time. Background silence frames are also encoded with a much smaller number of bytes. Fax frames have a length and sub-frame type as determined by the codec being used.

However, prior to using SuperPackets, calls which are to be combined are identified (or "set up") through the MUX. Many forms of call setup control information can be implemented, including, but not limited to H.29 1 call control. In an exemplary embodiment of the present invention, a simple model with a centralized system control is used. When an originating point starts a call, it contacts a front-end service which validates the accounting information and passes the call onto a resource manager. The resource manager is in contact with many or all possible terminating points and knows their current status, load and capabilities. When a suitable terminating point is found, the resource manager sends out a channel allocation request and waits for a response. This request identifies the originating point, which the terminating point will contact directly if resources permit. If the terminating point accepts the call from the resource manager, the call control is effectively transferred to the terminating point. When the call ends, for whatever reason, an end of call message is sent back to the resource manager which forwards it on the system database control process.

In the MUX implementation, the resource manager views the MUX as the terminating point, while the MUX acts as a proxy for the real terminating point. The MUX forwards the channel allocation request to the terminating point, but changes the message to indicate that the call is from the MUX itself. When a successful response is received from the terminating point, the MUX will then contact the originating point, as though it were the terminating point. The MUX will then assemble and disassemble packets into SuperPackets as described earlier.

The key to not exceeding the bandwidth available on the link between the MUX and the real terminating server is based on two features of the implementation:

1) No voice frame data is being sent when a channel is idle, and
2) Call setup messages are flow controlled to result in the same or lower data rates as found in the voice packets themselves. Therefore, the terminating point will not respond as soon as possible with the channel allocation response, but, rather, wait a predefined number of milliseconds to control the data flow. This does not affect the overall system design or performance, but does effectively control the bandwidth on the link.

By way of example, five call control messages, their contents and size in bytes are described below.

Change Allocation Request (from source manager to MUX to terminating point)

| Call ID | 4 | system unique call number |
|---|---|---|
| IP address | 4 | of originating point |
| TCP Control port | 2 | of originating point |
| UDP Voice port | 2 | of originating point |

-continued

| Dialed number | 15 | (BCD encoded) |
|---|---|---|
| Max talk time | 2 | in seconds |
| Encoding Info | 2 | (including frame size) |

Channel Allocation Response (from terminating point to MUX to resource manager)

| Call ID | 4 | |
|---|---|---|
| Channel | 1 | on the terminating point |
| Status | 1 | (success, failure) |

Setup Call Request (from terminating point to MUX to originating point)

| IP address | 4 | of terminating point |
|---|---|---|
| UDP Voice port | 2 | of terminating point |
| Capabilities | 2 | of terminating point (duplex, silence suppression, etc.) |

Setup Call Response (from originating point to MUX to terminating point)

| Capabilities | 2 | or originating point (duplex, silence suppression, etc.) |
|---|---|---|

End of Call Data (from terminating point to MUX to resource manager)

| Call ID | 4 | |
|---|---|---|
| Status | 1 | (no answer, regular termination, etc.) |
| Start Time | 4 | (UNIX time, or similar) |
| End Time | 4 | (UNIX time, or similar) |

A computer 100 includes a computer housing 102 that houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices (e.g., a keyboard 122 and mouse 124) and a monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of compression of SuperPackets.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for assembling and disassembling packets and SuperPackets. The computer code devices of the present invention can be any interpreted or executable code mechanism, including but not limited to scripts, interpreters, dynamic link libraries, Java classes, and complete executable programs.

The computer readable medium controls a communications adapter 110 to receive packets from a first remote computer and to place the received packets into the memory 108. If the packets are individual packets, then the packets are combined into a SuperPacket and sent out via the communications adapter 110 (or via an alternate communications adapter 110' (not shown)) to the second remote computer. If the packets received are SuperPackets, the reverse process of disassembling and transmission is performed. The communications adapters 110 and 110' can be any one of a modem, an ethernet card, a token ring, an FDDI, and an ATM controller.

Although the above description has been given in terms of a computer 100, in an alternate embodiment, the MUX 230 is fully integrated into a router 210 or a bridge. In that alternate embodiment of a MUX/router, the assembly and disassembly of packets and SuperPackets is performed internally to the MUX/router. Similarly, in yet another alternate embodiment, the MUX 230 may be integrated into individual voice over IP gateways 200. In that embodiment of the MUX/gateway, the originating and determining gateways communicate directly rather than through an intermediate MUX. Such a configuration reduces the delays associated with transmission, assembly/disassembly, and retransmission. Each of these integrated solutions utilize messages to the integrated devices directly to configure the integrated devices.

Figure 6A:
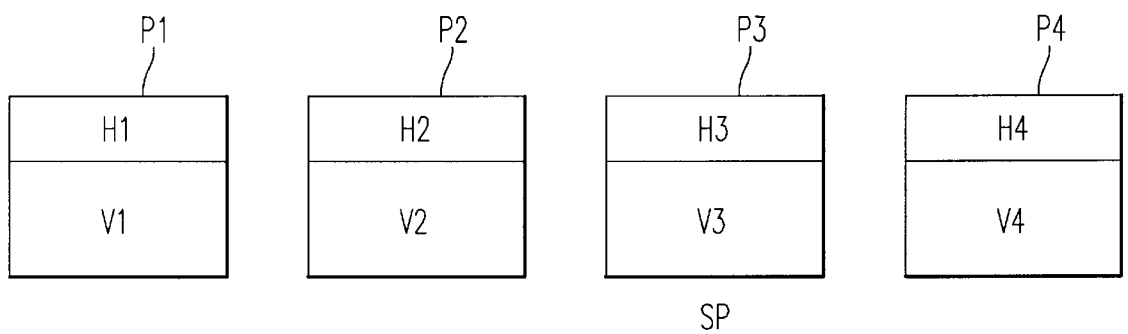
FIGS. 6A and 6B are block diagrams of individual packets and a SuperPacket, respectively.
Figure 6B:
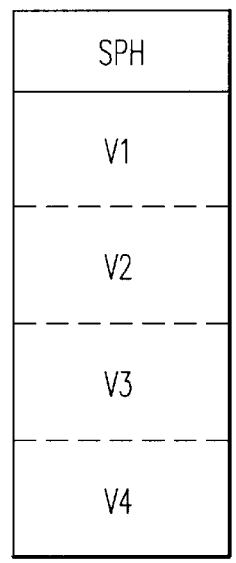

As shown in FIG. 6A, four voice packets, P1–P4, each include a respective header (H1–H4) and voice data (V1–V4). As shown in FIG. 6B, the four voice packets are combined into a single SuperPacket, SP, with a SuperPacket header (SPH) and the individual voice data payloads (V1–V4) from the original packets P1–P4. When the number of channels to be combined causes the total number of bytes to exceed the maximum wide area network packet size, the SuperPackets are divided into smaller SuperPackets which are below the maximum packet size.

Although the above discussion of header information has been provided with reference to a particular set of headers, one of ordinary skill in the art would understand that other header information is possible. In particular, the system of the present invention can use one or more of the source IP address, destination IP address, UDP source port and UDP destination port to contain some of the header information described herein. By reserving certain addresses or port identifiers, the SuperPacket-specific MUX and/or router and/or gateway can convert between addresses or ports listed in the header itself and information passed to the MUX and/or router and/or gateway during call setup.

Obviously, numerous modifications and variations of the present invention are possible in light of the above teachings. It is therefore to be understood that, within the scope of the appended claims, the invention may be practiced otherwise than as specifically described herein.

What is claimed is:

1. A method of providing compression of plural data packets into a single packet, the method comprising the steps of:
   transmitting call setup information to a packet multiplexer to identify destinations of first and second independently addressable packets;
   receiving the first and second packets at the packet multiplexer, each of the first and second packets including a header and a data payload;
   analyzing the respective first and second headers of the first and second packets to produce a combined header that is smaller than a size of the first and second headers combined;
   concatenating the combined header and the first and second payloads into a SuperFrame; and
   transmitting the SuperFrame to a destination application.

2. The method according to claim 1, wherein the first and second data payloads comprise digitized voice signals.

3. The method according to claim 1, wherein the first and second data payloads comprise non-voice signals.

4. A method of providing compression of plural packets into a single packet, the method comprising the steps of:
   transmitting call setup information to a first packet multiplexer to identify destinations of first and second independently addressable packets;
   receiving the first and second independently addressable packets at the first packet multiplexer, each of the first and second packets including a header and a data payload;
   analyzing the respective first and second headers of the first and second packets to produce a combined header that is smaller than a size of the first and second headers combined;
   concatenating the combined header and the first and second payloads into a SuperFrame; and
   transmitting the SuperFrame to a second packet multiplexer.

5. The method according to claim 4, further comprising the step of transmitting call setup information to the second packet multiplexer to identify destinations of the first and second payloads within the SuperFrame.

6. The method according to claim 4, wherein the first and second data payloads comprise digitized voice signals.

7. The method according to claim 4, wherein the first and second data payloads comprise non-voice signals.

8. A computer program product for controlling a processor to compress plural packets into a single packet, the computer program product controlling the processor to perform the steps of:
   transmitting call setup information to a first packet multiplexer to identify destinations of first and second independently addressable packets;
   receiving the first and second independently addressable packets at the first packet multiplexer, each of the first and second packets including a header and a data payload;
   analyzing the respective first and second headers of the first and second packets to produce a combined header that is smaller than a size of the first and second headers combined;
   concatenating the combined header and the first and second payloads into a SuperFrame; and
   transmitting the SuperFrame to a second packet multiplexer.

9. The computer program product according to claim 8, further comprising the step of transmitting call setup information to the second packet multiplexer to identify destinations of the first and second payloads within the SuperFrame.

10. The computer program product according to claim 8, wherein the first and second data payloads comprise digitized voice signals.

11. The computer program product according to claim 8, wherein the first and second data payloads comprise non-voice signals.

* * * * *